US006830856B2

(12) United States Patent
Tsai et al.

(10) Patent No.: US 6,830,856 B2
(45) Date of Patent: Dec. 14, 2004

(54) METHOD FOR FABRICATING COLOR FILTER

(75) Inventors: Yaw-Ming Tsai, Taichung (TW); Shih-Chang Chang, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 0 days.

(21) Appl. No.: 10/355,188

(22) Filed: Jan. 31, 2003

(65) Prior Publication Data

US 2004/0151994 A1 Aug. 5, 2004

(30) Foreign Application Priority Data

Dec. 30, 2002 (TW) .................................. 91137836 A

(51) Int. Cl.[7] .......................... G02B 5/20; G02F 1/1335
(52) U.S. Cl. ........................................ 430/7; 347/106
(58) Field of Search ........................... 430/7; 347/106, 347/107

(56) References Cited

U.S. PATENT DOCUMENTS 5,681,675 A * 10/1997 Kurauchi et al. ............. 430/20
6,399,257 B1 * 6/2002 Shirota et al. ................. 430/7

FOREIGN PATENT DOCUMENTS

JP          2002-122723 A   *  4/2002

* cited by examiner

Primary Examiner—John A. McPherson
(74) Attorney, Agent, or Firm—Lowe Hauptman Gilman & Berner, LLP

(57) ABSTRACT

This invention relates to a method for fabricating a color filter by using the theory of surface tension. The surface tension is very small when hydrophobic material is on hydrophobic surface and the surface tension is very large when hydrophobic material is on hydrophilic surface. It avoids to blurry with the printed hydrophobic color materials and can get fine color filter with excellent color reappearance when the surface of pixel area is a hydrophobic surface and the surface of non-pixel area is a hydrophilic surface. This invention comprises: forming a dielectric layer on substrate; forming a plurality of scan lines and a plurality of data lines on substrate to define a plurality of pixel areas and a non-pixel area; forming a hydrophobic surface on the plurality of pixel areas; forming a hydrophilic surface on the non-pixel area; and using ink-jet printing method to print the hydrophobic color materials on the plurality of areas.

15 Claims, 4 Drawing Sheets

METHOD FOR FABRICATING COLOR FILTER

BACKGROUND OF THE INVENTION

1. Field of the Invention

The invention is relates to a method for fabricating a color filter, more particularly to a method for fabricating a color filter by using the theory of surface tension. The surface tension is very small when hydrophobic material is on hydrophobic surface and the surface tension is very large when hydrophobic material is on hydrophilic surface. It avoids to blurry with the printed hydrophobic color materials and can get fine color filter with excellent color reappearance when the surface of pixel area is a hydrophobic surface and the surface of non-pixel area is a hydrophilic surface.

2. Description of the Prior Art

In a conventional liquid crystal display (LCD) apparatus, two electrode substrates are faced with a cell gap. Each of the electrode substrates has electrodes that generate pixels. A liquid crystal layer is held between the two electrode substrates so that the peripheral portion of the liquid crystal layer is sealed. In this manner, the principal portions of the LCD apparatus are constructed.

In a LCD apparatus that can especially display a color image on the screen, a color filter is used. The color filter is constructed by disposing color cells of three primary colors or a plurality of hues such as R, G, and B (red, green, and blue) or Y, M, and C (yellow, magenta, and cyan) corresponding to individual pixels on at least one of the two electrode substrates.

Many fabricating methods of the color filters such as pigment dispersing method, dye dispersing method, electrodepositing method, and printing method have been proposed. In the pigment dispersing method, a pigment is dispersed to a layer to be colored and thereby a color filter is formed. In the dye dispersing method, a dye is dispersed to a layer to be colored and thereby a color filter is formed. In the electrodepositing method, a color filter is formed by electrodeposition. In the printing method, a coloring material of the color filter that is an ink is printed on a substrate using a printing plate such as an intaglio printing plate or an offset plate. The abovementioned methods have been practically used.

But, in such conventional fabricating methods, since the lithography process and the etching process are used repeatedly, the process of the color filter becomes very complicated. In addition, to deal with pixel sizes that are becoming smaller and smaller, the accuracy of the lithography process and the etching process should be improved. It is difficult to fabricate such color filters with high accuracy and high yield. Moreover, more than three times lithography process and the etching process are used to fabricate the color filter of RGB colors. The complication and cost of the above processes will increase accordingly.

In the printing method, although the etching technology is not directly used, the fabrication of the printing plates is very complicated. Moreover, in the printing method, it is difficult to form precise color filters that correspond to the sizes of fine pixels.

Recently, an inkjet printing method of a fine color filter has been proposed. However, when a color filter is formed by the inkjet print method, the sprayed coloring material may blur with another coloring material at a boundary region thereof so that it is difficult to reproduce clear colors. Thus, even if color filters with very high throughput are formed by an ink jet unit, the reappearance of colors of the color filters is low. Consequently, the color reappearance and display quality of color images of the LCD apparatus using the color filters fabricated by the said inkjet print method are inferior.

SUMMARY OF THE INVENTION

In the light of the state of the art described above, it is an object of the present invention to provide a method for fabricating a color filter which is immune to the problems of the conventional method for fabricating a color filter described above.

It is another object of this invention to provide a method for fabricating a color filter that the surface of pixel area is a hydrophobic surface and the surface of non-pixel area is a hydrophilic surface to avoid to blurry with the printed hydrophobic color materials and get fine color filter with excellent color reappearance.

It is a further object of this invention to provide a method for fabricating a color filter that the hydrophobic color material is easily printed on the hydrophobic surface of polysilicon layer or amorphous silicon layer irradiated with ultraviolet rays over the pixel areas of glass substrate and the hydrophobic color material is not easily printed on the hydrophilic surface of $SiO_2$ layer irradiated with ultraviolet rays over the non-pixel area of glass substrate to avoid to blurry with the printed hydrophobic color materials and get fine color filter with excellent color reappearance.

In view of the above and other objects which will become apparent as the description proceeds, there is provided according to a general aspect of the present invention a method for fabricating color filter which comprises forming a dielectric layer on a substrate; forming a plurality of scan lines and a plurality of data lines on said dielectric layer to define a plurality of pixel areas and a non-pixel area; forming a hydrophobic surface on said plurality of pixel areas; forming a hydrophilic surface on said non-pixel area; and printing a hydrophobic color material on said plurality of pixel areas by inkjet printing method.

Base on the idea described above, wherein said scan lines and said data lines cross vertically.

Base on the aforementioned idea, the method for fabricating color filter further comprises a plurality of thin film transistors (TFTs) formed on said substrate.

Base on the idea described above, wherein said scan lines, said data lines and said TFTs are connected electrically.

In view of the above and other objects which will become apparent as the description proceeds, there is provided according to a general aspect of the present invention a method for fabricating color filter which comprises forming a dielectric layer on a substrate; forming a plurality of scan lines and a plurality of data lines on said dielectric layer to define a plurality of pixel areas and a non-pixel area; forming a hydrophilic surface on said plurality of pixel areas; forming a hydrophobic surface on said non-pixel area; and printing a hydrophilic color material on said plurality of pixel areas by inkjet printing method.

Base on the idea described above, wherein said scan lines and said data lines cross vertically.

Base on the aforementioned idea, the method for fabricating color filter further comprises a plurality of thin film transistors (TFTs) formed on said substrate.

Base on the idea described above, wherein said scan lines, said data lines and said TFTs are connected electrically.

In view of the above and other objects which will become apparent as the description proceeds, there is provided according to a general aspect of the present invention a method for fabricating color filter which comprises forming a dielectric layer on a substrate; forming a plurality of scan lines and a plurality of data lines on said dielectric layer to define a plurality of pixel areas and a non-pixel area; forming a $SiO_2$ layer on said dielectric layer; irradiating said $SiO_2$ layer with ultraviolet rays; forming a mask layer on said $SiO_2$ layer; irradiating said mask layer with ultraviolet rays; removing said mask layer on said non-pixel area to expose said $SiO_2$ layer; and printing a hydrophobic color material on said plurality of pixel areas by inkjet printing method.

Base on the idea described above, wherein said scan lines and said data lines cross vertically.

Base on the aforementioned idea, the method for fabricating color filter further comprises a plurality of thin film transistors (TFTs) formed on said substrate.

Base on the idea described above, wherein said scan lines, said data lines and said TFTs are connected electrically.

Base on the aforementioned idea, wherein the step of irradiating said $SiO_2$ layer with ultraviolet rays further comprises inserting a first photomask above said substrate; and irradiating said $SiO_2$ layer with ultraviolet rays through said first photomask.

Base on the idea described above, wherein the patterns of said first photomask over said plurality of pixel areas are opaque.

Base on the aforementioned idea, wherein said mask layer is selected from the group consisting of polysilicon and amorphous silicon.

Base on the idea described above, wherein the step of irradiating said mask layer with ultraviolet rays further comprises inserting a second photomask above said substrate; and irradiating said mask layer with ultraviolet rays through said second photomask.

Base on the aforementioned idea, wherein the pattern of said second photomask over said non-pixel area is opaque.

In view of the above and other objects which will become apparent as the description proceeds, there is provided according to a general aspect of the present invention a method for fabricating color filter which comprises forming a dielectric layer on a substrate; forming a plurality of scan lines and a plurality of data lines on said dielectric layer to define a plurality of pixel areas and a non-pixel area; forming a $SiO_2$ layer on said dielectric layer; forming a mask layer on said $SiO_2$ layer; removing said mask layer on said non-pixel area to expose said $SiO_2$ layer; irradiating said substrate with ultraviolet rays; and printing a hydrophobic color material on said plurality of pixel areas by inkjet printing method.

Base on the idea described above, wherein said scan lines and said data lines cross vertically.

Base on the aforementioned idea, the method for fabricating color filter further comprises a plurality of thin film transistors (TFTs) formed on said substrate.

Base on the idea described above, wherein said scan lines, said data lines and said TFTs are connected electrically.

Base on the aforementioned idea, wherein said mask layer is selected from the group consisting of polysilicon and amorphous silicon.

Base on the idea described above, wherein the step of removing said mask layer on said non-pixel area to expose said $SiO_2$ layer further comprises forming a photoresist layer on said mask layer; patterning said photoresist layer; and etching said mask layer that is not covered by said patterned photoresist layer.

In view of the above and other objects which will become apparent as the description proceeds, there is provided according to a general aspect of the present invention a method for fabricating color filter which comprises forming a dielectric layer on a substrate; forming a plurality of scan lines and a plurality of data lines on said dielectric layer to define a plurality of pixel areas and a non-pixel area; irradiating said substrate with ultraviolet rays; and printing a hydrophilic color material on said plurality of pixel areas by inkjet printing method.

Base on the idea described above, wherein said scan lines and said data lines cross vertically.

Base on the aforementioned idea, the method for fabricating color filter further comprises a plurality of thin film transistors (TFTs) formed on said substrate.

Base on the idea described above, wherein said scan lines, said data lines and said TFTs are connected electrically.

Base on the aforementioned idea, wherein said dielectric layer is a $SiO_2$ layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
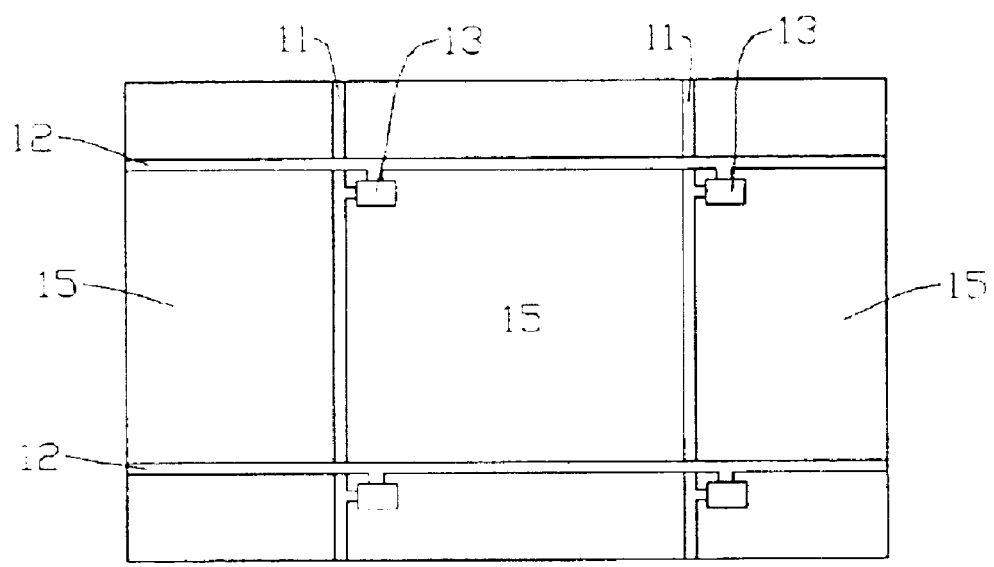
FIG. 1 illustrates a view of the plan view of color liquid crystal display device.
Figure 2:
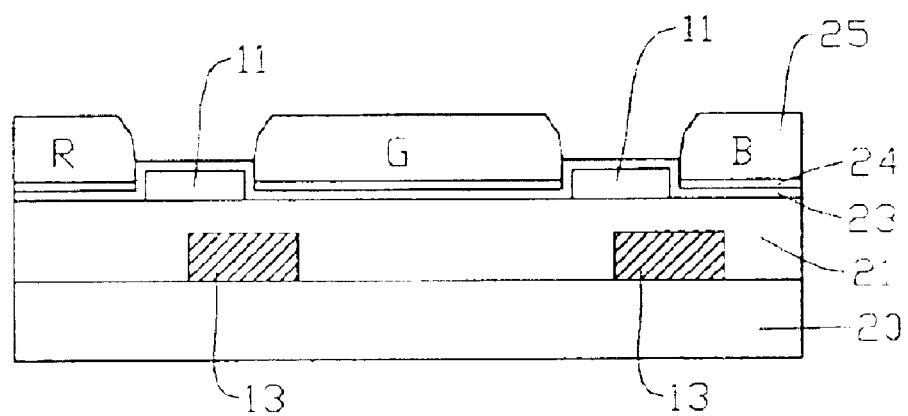
FIG. 2 illustrates a cross-section view of color liquid crystal display device according to the first and second embodiments of the present invention.
Figure 3A:
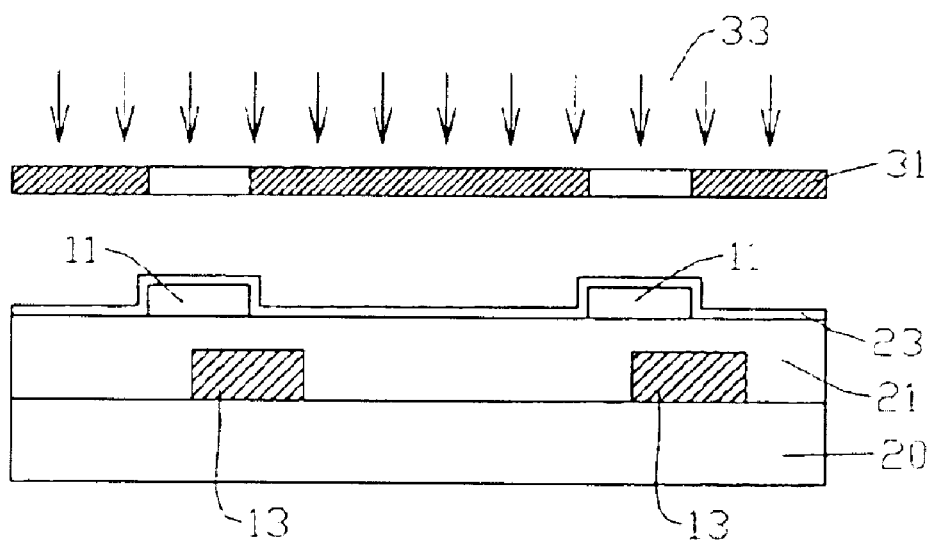
FIGS. 3A~3B illustrate the schematic process figures according to the first embodiment of the present invention.
Figure 3B:
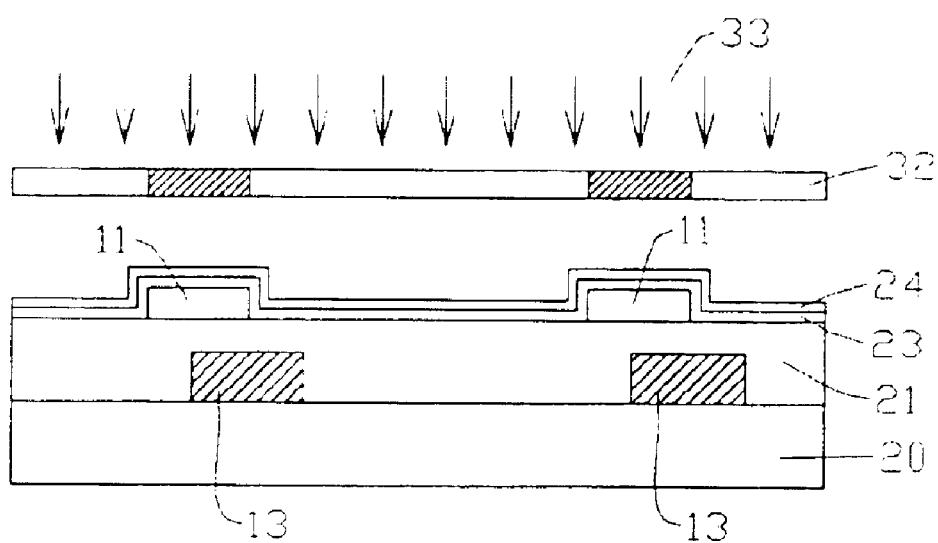

The first embodiment according to this invention is referred to FIG. 1, FIG. 2, FIGS. 3A and 3B. FIG. 1 shows the plan view of color liquid crystal display device. FIG. 2 shows the cross-section view of color liquid crystal display device. FIGS. 3A and 3B are the schematic process figures. First, TFTs (thin film transistors) 13 are formed on the glass substrate 20. TFT 13 can be made by using the ordinary semiconductor process. Then, the glass substrate 20 and TFTs 13 are substantially blanketed with a dielectric layer 21. The scan lines 12 and the data lines 11 crossed vertically the scan lines 12 are formed on the dielectric layer 21 in the matrix pattern, wherein the scan lines 12, the data lines 11 and TFTs 13 are connected electrically. Next, as illustrated in FIG. 3A, a $SiO_2$ layer 23 is formed on the dielectric layer 21 and the glass substrate 20 is irradiated with ultraviolet rays 33 after a mask 31 is inserted above the glass substrate 20. The patterns over the pixel areas 15 of glass substrate 20 on mask 31 are opaque, so the $SiO_2$ layer 23 which is not covered with the patterns of mask 31 is selectively exposed under ultraviolet rays 33. A hydrophilic $SiO_2$ surface will be produced when the $SiO_2$ layer is exposed under ultraviolet rays. In other words, the hydrophilic surface of $SiO_2$ layer over the non-pixel area of glass substrate 20 will be produced under the exposure of ultraviolet rays 33.

Then, as illustrated in FIG. 3B, an amorphous silicon layer or a polysilicon layer 24 is formed on the $SiO_2$ layer 23 and the glass substrate 20 is irradiated with ultraviolet rays 33 again after another mask 32 is inserted above the glass substrate 20. The pattern over the non-pixel area of glass substrate 20 on mask 32 is opaque, so the polysilicon layer or an amorphous silicon layer 24 which is not covered with the pattern of mask 32 is selectively exposed under ultraviolet rays 33. A hydrophobic polysilicon or amorphous silicon surface will be produced when the polysilicon layer or the amorphous silicon layer 24 layer is exposed under ultraviolet rays. In other words, the hydrophobic surface of polysilicon layer or amorphous silicon layer over the pixel areas 15 of glass substrate 20 will be produced under the exposure of ultraviolet rays 33. The following step is to remove the polysilicon layer or the amorphous silicon layer 24 over the non-pixel area of glass substrate 20 so as to expose the $SiO_2$ layer, which is irradiated with ultraviolet rays 33. Finally, the inkjet printing method that the hydrophobic color materials having RGB colors will be printed on the pixel areas 15 of glass substrate 20 by using an inkjet-printing device can be implemented. In this manner, the pixel areas 15 of glass substrate 20 will be colored to fabricate the color filter.

Because the surface tension of hydrophobic materials on the hydrophobic surface is small, such materials are easy to be printed on the hydrophobic surface. On the other hand, the surface tension of hydrophobic materials on the hydrophilic surface is large and such materials are not easy to be printed on the hydrophilic surface. Thus, the hydrophobic color material is easily printed on the hydrophobic surface of polysilicon layer or amorphous silicon layer irradiated with ultraviolet rays over the pixel areas of glass substrate and the hydrophobic color material is not easily printed on the hydrophilic surface of $SiO_2$ layer irradiated with ultraviolet rays over the non-pixel area of glass substrate. Hence, when the hydrophobic color materials having RGB colors printed from the inkjet-printing device will be easy to adhere on the pixel areas due to its hydrophobic surface, and not easy to adhere on the non-pixel area due to its hydrophilic surface. In this manner, the boundary region of each pixel area can be avoided to blurry with the printed color materials so as the color filter 25 with the excellent color reappearance is fabricated.

Figure 4A:
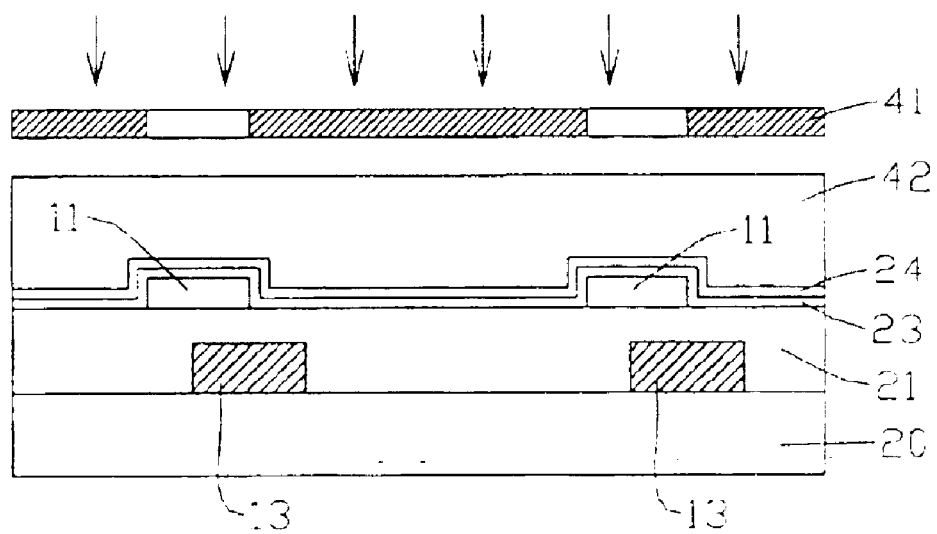
FIGS. 4A~4B illustrate the schematic process figures according to the second embodiment of the present invention.
Figure 4B:
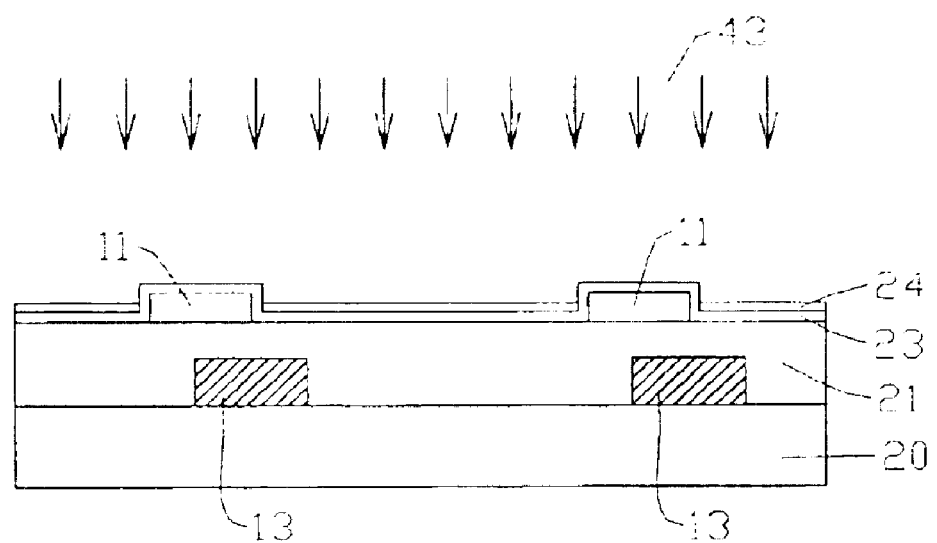

The second embodiment according to this invention is referred to FIG. 1, FIG. 2, FIGS. 4A and 4B. FIG. 1 shows the plan view of color liquid crystal display device. FIG. 2 shows the cross-section view of color liquid crystal display device. FIGS. 4A and 4B are the schematic process figures. First, TFTs (thin film transistors) 13 are formed on the glass substrate 20. TFT 13 can be made by using the ordinary semiconductor process. Then, the glass substrate 20 and TFTs 13 are substantially blanketed with a dielectric layer 21. The scan lines 12 and the data lines 11 crossed vertically the scan lines 12 are formed on the dielectric layer 21 in the matrix pattern, wherein the scan lines 12, the data lines 11 and TFTs 13 are connected electrically. Next, as illustrated in FIG. 4A, a $SiO_2$ layer 23 is formed on the dielectric layer 21 and an amorphous silicon layer or a polysilicon layer 24 is formed on the $SiO_2$ layer 23. A photoresist layer 42 is formed on the glass substrate 20 and patterned by the photomask 41 having the opaque patterns over the pixel areas 15 of glass substrate 20. Therefore, the photoresist layer over the pixel areas 15 of glass substrate 20 is not removed and the other photoresist layer is removed under development process.

Then, the amorphous silicon layer or the polysilicon layer 24 not covered with the patterned photoresist layer 42 is etched to expose the $SiO_2$ layer 23. The glass substrate 20 is irradiated with ultraviolet rays 43 after the patterned photoresist layer 42 is removed. A hydrophobic polysilicon or amorphous silicon surface will be produced when the polysilicon layer or the amorphous silicon layer 24 layer is exposed under ultraviolet rays and a hydrophilic $SiO_2$ surface will be produced when the $SiO_2$ layer 23 layer is exposed under ultraviolet rays. In other words, the hydrophobic surface of polysilicon layer or amorphous silicon layer 24 over the pixel areas 15 of glass substrate 20 will be produced under the exposure of ultraviolet rays 43 and the hydrophilic surface of $SiO_2$ layer 23 over the non-pixel area of glass substrate 20 will be produced under the exposure of ultraviolet rays 43. Finally, the inkjet printing method that the hydrophobic color materials having RGB colors will be printed on the pixel areas 15 of glass substrate 20 by using an inkjet-printing device can be implemented. In this manner, the pixel areas 15 of glass substrate 20 will be colored to fabricate the color filter.

Because the surface tension of hydrophobic materials on the hydrophobic surface is small, such materials are easy to be printed on the hydrophobic surface. On the other hand, the surface tension of hydrophobic materials on the hydrophilic surface is large and such materials are not easy to be printed on the hydrophilic surface. Thus, the hydrophobic color material is easily printed on the hydrophobic surface of polysilicon layer or amorphous silicon layer irradiated with ultraviolet rays over the pixel areas of glass substrate and the hydrophobic color material is not easily printed on the hydrophilic surface of $SiO_2$ layer irradiated with ultraviolet rays over the non-pixel area of glass substrate. Hence, when the hydrophobic color materials having RGB colors printed from the inkjet-printing device will be easy to adhere on the pixel areas due to its hydrophobic surface, and not easy to adhere on the non-pixel area due to its hydrophilic surface. In this manner, the boundary region of each pixel area can be avoided to blurry with the printed color materials so as the color filter 25 with the excellent color reappearance is fabricated.

Figure 5:
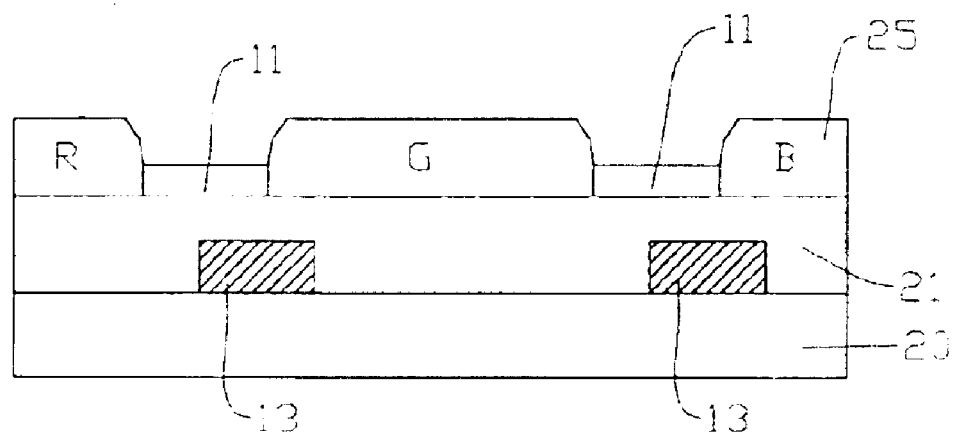
FIG. 5 illustrates a cross-section view of color liquid crystal display device according to the third embodiment of the present invention.
Figure 6:
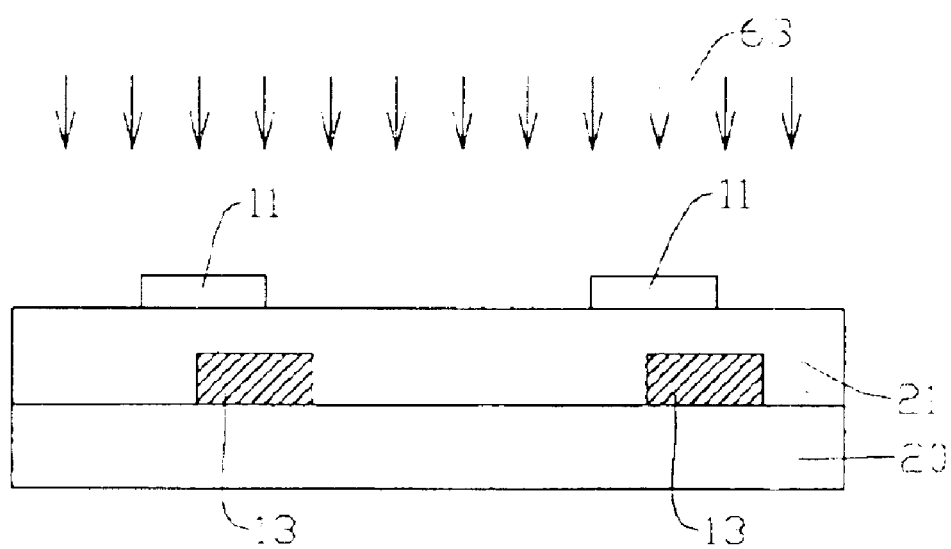
FIG. 6 illustrates the schematic process figure according to the third embodiment of the present invention.

The third embodiment according to this invention is referred to FIG. 1, FIG. 5, and FIG. 6. FIG. 1 shows the plan view of color liquid crystal display device. FIG. 5 shows the cross-section view of color liquid crystal display device. FIG. 6 is the schematic process figure. First, TFTs (thin film transistors) 13 are formed on the glass substrate 20. TFT 13 can be made by using the ordinary semiconductor process. Then, the glass substrate 20 and TFTs 13 are substantially blanketed with a dielectric layer 21, which is a $SiO_2$ layer. The scan lines 12 and the data lines 11 crossed vertically the scan lines 12 are formed on the dielectric layer 21 in the matrix pattern, wherein the scan lines 12, the data lines 11 and TFTs 13 are connected electrically. Next, as illustrated in FIG. 6, the glass substrate 20 is irradiated with ultraviolet rays 63 by using the scan lines 12 and the data lines 11 as the mask. The dielectric layer 21 that is not covered with the scan lines 12 and the data lines 11 will be exposed under ultraviolet rays 63. A hydrophilic $SiO_2$ surface will be produced when the $SiO_2$ layer is exposed under ultraviolet rays and the scan lines 12 and the data lines 11 with the hydrophobic surface because they is made with metal having the hydrophobic property that is not changed under irradiation of ultraviolet rays. In other words, the hydrophilic surface of $SiO_2$ layer 21 over the pixel areas 15 of glass substrate 20 will be produced under the exposure of ultraviolet rays 63 and the scan lines 12 and the data lines 11 over the non-pixel area of glass substrate 20 have the hydrophobic surface themselves. Finally, the inkjet printing method that the hydrophobic color materials having RGB colors will be printed on the pixel areas 15 of glass substrate 20 by using an inkjet-printing device can be implemented. In this manner, the pixel areas 15 of glass substrate 20 will be colored to fabricate the color filter.

Because the surface tension of hydrophilic materials on the hydrophilic surface is small, such materials are easy to be printed on the hydrophilic surface. On the other hand, the surface tension of hydrophilic materials on the hydrophobic surface is large and such materials are not easy to be printed on the hydrophobic surface. Thus, the hydrophilic color material is easily printed on the hydrophilic surface of $SiO_2$ layer irradiated with ultraviolet rays over the pixel areas of glass substrate and the hydrophilic color material is not easily printed on the hydrophobic surface of scan lines and data lines made with metal over the non-pixel area of glass substrate. Hence, when the hydrophilic color materials having RGB colors printed from the inkjet-printing device will be easy to adhere on the pixel areas due to its hydrophilic surface, and not easy to adhere on the non-pixel area due to its hydrophobic surface. In this manner, the boundary region of each pixel area can be avoided to blurry with the printed color materials so as the color filter 25 with the excellent color reappearance is fabricated.

Although the specific embodiment has been illustrated and described, it will be obvious to those skilled in the art that various modifications may be made without departing from what is intended to be limited solely by the appended claims.

What is claimed is:

1. A method for fabricating color filter, comprising:
    forming a dielectric layer on a substrate;
    forming a plurality of scan lines and a plurality of data lines on said dielectric layer to define a plurality of pixel areas and a non-pixel area;
    forming a $SiO_2$ layer on said dielectric layer;
    irradiating said $SiO_2$ layer with ultraviolet rays;
    forming a mask layer on said $SiO_2$ layer;
    irradiating said mask layer with ultraviolet rays;
    removing said mask layer on said non-pixel area to expose said $SiO_2$ layer; and
    printing a hydrophobic color material on said plurality of pixel areas by inkjet printing method.

2. The method for fabricating color filter according to claim 1, wherein said scan lines and said data lines cross vertically.

3. The method for fabricating color filter according to claim 1 further comprising a plurality of thin film transistors (TFTs) formed on said substrate.

4. The method for fabricating color filter according to claim 3, wherein said scan lines, said data lines and said TFTs are connected electrically.

5. The method for fabricating color filter according to claim 3, wherein the step of irradiating said $SiO_2$ layer with ultraviolet rays further comprises:
    inserting a first photomask above said substrate; and
    irradiating said $SiO_2$.

6. The method for fabricating color filter according to claim 5, wherein the patterns of said first photomask over said plurality of pixel areas are opaque.

7. The method for fabricating color filter according to claim 1, wherein said mask layer is selected from the group consisting of polysilicon and amorphous silicon.

8. The method for fabricating color filter according to claim 1, wherein the step of irradiating said mask layer with ultraviolet rays further comprises:
    inserting a second photomask above said substrate; and
    irradiating said mask layer with ultraviolet rays through said second photomask.

9. The method for fabricating color filter according to claim 8, wherein the pattern of said second photomask over said non-pixel area is opaque.

10. A method for fabricating color filter, comprising:
    forming a dielectric layer on a substrate;
    forming a plurality of scan lines and a plurality of data lines on said dielectric layer to define a plurality of pixel areas and a non-pixel area;
    forming a $SiO_2$ layer on said dielectric layer;
    forming a mask layer on said $SiO_2$ layer;
    removing said mask layer on said non-pixel area to expose said $SiO_2$ layer;
    irradiating said substrate with ultraviolet rays; and
    printing a hydrophobic color material on said plurality of pixel areas by inkjet printing method.

11. The method for fabricating color filter according to claim 10, wherein said scan lines and said data lines cross vertically.

12. The method for fabricating color filter according to claim 10, further comprising a plurality of thin film transistors (TFTs) formed on said substrate.

13. The method for fabricating color filter according to claim 12, wherein said scan lines, said data lines and said TFTs are connected electrically.

14. The method for fabricating color filter according to claim 10, wherein said mask layer is selected from the group consisting of polysilicon and amorphous silicon.

15. The method for fabricating color filter according to claim 10, wherein the step of removing said mask layer on said non-pixel area to expose said $SiO_2$ layer further comprises:
    forming a photoresist layer on said mask layer;
    patterning said photoresist layer; and
    etching said mask layer that is not covered by said patterned photoresist layer.

* * * * *